United States Patent Office 3,034,958
Patented May 15, 1962

3,034,958
SOPORIFIC COMPOSITIONS
Nathan Millman, Somerville, N.J., assignor to Ortho Pharmaceutical Corporation, a corporation of New Jersey
No Drawing. Continuation of application Ser. No. 642,934, Feb. 28, 1957. This application Jan. 26, 1960, Ser. No. 4,595
17 Claims. (Cl. 167—52)

This is a continuation of my copending application Serial No. 642,934, filed February 28, 1957, now abandoned.

This invention relates to soporific compositions that are effective as hypnotic agents. More specifically, my invention is concerned with compositions containing a known hypnotic, and in addition thereto a 2-aminoalkoxypyrimidine having the formula:

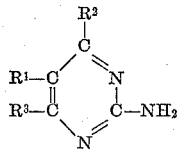

in which $R^1$ is selected from the group consisting of alkoxy, aryloxy, and arlkoxy radicals and $R^2$ and $R^3$ are selected from the group consisting of hydrogen, alkoxy, aryloxy, and aralkoxy radicals.

A large number of compounds are well known for their property of inducing sleep or sedation. The barbiturates which are substituted with two organic radicals at the 5-position of the barbituric acid ring system are particularly effective. Sulfur analogues of the barbiturates are also useful. Compounds having known hypnotic activity vary widely in their molecular structure and functional groups. Thus unsaturated alcohols such as "Dormison" (3-methyl-1-pentyn-3-ol), the carbamates such as "Valmid" (1-ethynyl-cyclohexyl carbamate), piperidine derivatives such as "Noludar" (3,3-diethyl-5-methyl-2,4-piperidinedione), and glyceryl derivatives such as "Tolserol" (3-ortho-toloxy-1,2-propanediol) as well as the hydantoins, pyridones, pyrrolidones, and thiazolidones, which share with the 5,5-dialkyl barbituric acids, the structural segment $$R^1\text{—}R^2CONH$$

have been employed as hypnotics at various periods.

The synergism of the antipyretic effect of pyrazolone by hypnotics has been reported. "Veramon" consists of two molecules aminopyrine and one molecule of diethyl barbituric acid. Its antipyretic effect is greater than the corresponding amount of aminopyrine alone. However, to the best of my knowledge, I am the first to note that the hypnotic effect of the various hypnotics can be potentiated by the addition of certain substituted 2-aminopyrimidines.

It has now been found that compositions containing a hypnotic and a 2-aminoalkoxypyrimidine having the formula:

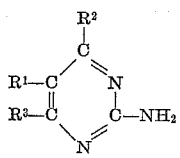

in which $R^1$ is selected from the group consisting of alkoxy, aryloxy, and aralkoxy radicals and $R^2$ and $R^3$ are selected from the group consisting of hydrogen, alkoxy, aryloxy, and aralkoxy radicals are particularly effective in inducing sleep and in prolonging the period of sleep induced by the administration of a given amount of drug. The effect of the composition is greater and more useful than could be anticipated from the known properties of the individual compounds of the type used in preparing the compositions. The utilization of these compositions permits the administration of a considerably reduced amount of a hypnotic with no decrease or even an actual increase in the soporific effect of the drug. This has certain advantages, as the undesirable side effects of the hypnotics can be considerably reduced.

The compositions of this invention consist of from about 10 parts by weight of a hypnotic together with about 100 parts by weight of the substituted 2-aminopyrimidine to about 250 parts by weight of a hypnotic with about 100 parts by weight of a substituted 2-aminopyrimidine. The relative proportions of the two compounds will naturally vary to some extent according to the particular hypnotic and the particular 2-aminopyrimidine present in the mixture. Of course, mixtures of two or more different hypnotics may be combined with two or more 2-aminoalkoxypyrimidines, but the relative proportions of the total amount of hypnotic to the total amount of 2-aminoalkoxypyrimidine should be within the limitations described above for maximum potentiation of hypnotic.

Hypnotics which I have noted to be more effective when combined with the 2-aminoalkoxypyrimidines are the barbiturates such as "Nembutol" (monosodium ethyl [1-methylbutyl] barbiturate), "Evipal" (N-methylcyclohexenyl barbituric acid), "Medomin" (5-ethyl-5-cyclohepten-1-yl barbituric acid), the unsaturated alcohols such as "Dormison" (methyl-ethyl-ethynyl carbinol), the carbamates such as "Valmid" (1-ethynyl-cyclohexyl carbamate), the piperidine derivatives such as "Noludar" (3,3-diethyl-5-methyl-2,4-piperidinedione), and the glyceryl derivatives such as 3-ortho-toloxy-1,2-propanediol.

The 2-aminoalkoxypyrimidines that I have found to be effective in increasing the hypnotic activity of the compounds mentioned above are compounds having the formula:

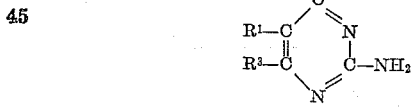

in which $R^1$ is selected from the group consisting of alkoxy, aryloxy, and aralkoxy radicals and $R^2$ and $R^3$ are selected from the group consisting of hydrogen, alkoxy, aryloxy, and aralkoxy radicals. More specifically, the 2-amino-5-alkoxypyrimidines such as the 2-amino-5-butoxypyrimidines, the 2-amino-5-hexoxypyrimidine; the 2-amino-5-aryloxypyrimidines such as the 2-amino-5-benzoxypyrimidine; and the 2-amino-5-aralkoxypyrimidines such as the 2-amino-5-phenethoxypyrimidine are suitable.

The 2-amino-4,5-dialkoxypyrimidines were also found to be effective, particularly the 4-methoxy-5-ethoxy, the 4,5-diethoxy, the 4-butoxy-5-ethoxy, the 4-ethoxy-5-butoxy, and the 4,5-dibutoxy compounds.

Substitution of an aralkoxy or an alkoxy group for the ethoxy groups in the series also synergizes the hypnotic effect. Examples of such compounds are the 2-amino-4-benzoxy-5-ethoxypyrimidine, the 2-amino-4-phenethoxy-5-ethoxypyrimidine, the 2-amino-4-ethoxy-5-benzoxypyrimidine, the 2-amino-4-ethoxy-5-phenethoxypyrimidine, and the 2-amino-4-benzoxy-5-butoxypyrimidine.

Compounds which are substituted by an alkoxy group in the 6-position on the 2-aminopyrimidine ring also were found to increase the hypnotic effects of known hypnotics. Examples of such pyrimidines are the 2-amino-4-ethoxy-6-ethoxy, and 2-amino-4-ethoxy-5-ethoxy-6-methylethoxy.

The compositions of my invention may be administered by various routes but particularly effective and convenient is the administration of the composition orally. Parenteral administration may also be used for these compositions. The materials may be prepared in any of the usual dosage forms, that is, in the form of capsules, tablets, elixirs, or solutions of various kinds with suitable sweetening and flavoring agents.

The potentiation effect of the substituted 2-amino-pyrimidines on hypnotics may be observed readily on mice or other animals by administering the individual drugs to groups of mice and a combination of the drugs to a third group. The third group showed a definite prolongation and increased depth of sleep over what could be anticipated. Similar effects may be observed on various other species of animals.

I have measured the hypnotic effect as a function of time (in minutes) during which the animal, when put on its side, can not right itself as it does normally by reflex action. The method is thus generally known as the "no righting reflex" procedure.

In conducting the tests, the "hypnotic time, average minutes" value is determined for a certain does of known hypnotic alone, and for a certain dose of the substituted 2-aminopyrimidine alone. Then both compounds are given at about the same time in their respective doses at which the preceding control tests were conducted. The "hypnotic time, average minutes" is determined for the combination. The drugs may be given at about the same time, at the same site, or actually mixed before administration. All determinations are conducted on a minimum of four animals and the results are averaged to give the "hypnotic time, average minutes." In my animal test experiments, the compositions of this invention are administered to mice by intra-peritoneal injection. I have also administered such compositions to rabbits (intravenous injection), and to rats orally (by stomach tube).

In the tables which follow, the average percent potentiation for the combination of drugs is given as a convenient index of the effectiveness of a particular composition. The "average percent potentiation" which appears in the tables is calculated from the formula $$\frac{A-B-C}{B+C} \times 100 = \text{average percent potentiation}$$

where A is the average hypnotic time in minutes of both compounds together, B is the average hypnotic time in minutes for the alkoxypyrimidine alone, and C is the average hypnotic time in minutes for the known hypnotic drug alone. For example, if the hypnotic drug alone gave a ten-minute reaction and the alkoxypyrimidine alone gave no reaction, while the combination of both together gave a forty-minute reaction, then $$A=40$$
$$B=0$$
$$C=10$$

and $$\frac{40-0-10}{0+10} \times 100 = \frac{30}{10} \times 100 = 300$$

Numerous examples of the composition of my invention are summarized in Tables I through IX, inclusive.

Tables I through IV, inclusive, illustrate the effectiveness of combining various 2-aminoalkoxypyrimidines with "Nembutal."

Table V illustrates the effectiveness of various hypnotics when combined with 2-amino-4,5-diethoxypyrimidine.

Table VI illustrates the effectiveness of various hypnotics when combined with 2-amino-4-benzoxy-5-butoxypyrimidine.

Table VII is significant for its information relative to the intravenous injection of the compositions of my invention.

Table VIII relates to the oral administration of the compositions.

Table IX reports the dose response determinations, or the effective amount in milligrams per kilogram of body weight when the hypnotic is administered together with certain quantities of particular 2-aminopyrimidines.

The sleep-induced animals seem to have no appreciable after effects. The onset of the hypnotic effect is quite rapid. The peak effect is reached shortly after sleep is induced. No evidence of excitement before sleep is observed.

TABLE I

2-Amino-5-Alkoxypyrimidines vs. Nembutal, Intraperitoneal

|  | Pyrimidine cpd. alone 100 mgm./kgm. hypnosis avg. min. (B) | Nembutal 40 mgm./kgm. hypnosis avg. min. (C) | Both cpds. hypnosis avg. min. (A) | Avg. percent potentiation $\frac{A-B-C}{B+C} \times 100$ |
|---|---|---|---|---|
| 2-amino-5-butoxypyrimidine | 0 | 13.5 | 32.5 | 141 |
| 2-amino-5-hexoxypyrimidine | 0 | 13.0 | 32.0 | 146 |
| 2-amino-5-benzoxypyrimidine | 0 | 17.0 | 53.0 | 212 |
| 2-amino-5-phenethoxypyrimidine | 0 | 19.0 | 33.0 | 74 |

TABLE II

2-Amino-4,5-Dialkoxypyrimidines vs. Nembutal, Intraperitoneal

|  | Pyrimidine cpd. alone 100 mgm./kgm. hypnosis avg. min. (B) | Nembutal 40 mgm./kgm. hypnosis avg. min. (C) | Both cpds. hypnosis avg. min. (A) | Avg. Percent potentiation $\frac{A-B-C}{B+C} \times 100$ |
|---|---|---|---|---|
| 2-amino-4-methoxy-5-ethoxypyrimidine | 0 | 7.7 | 54.8 | 612 |
| 2-amino-4-ethoxy-5-ethoxypyrimidine | 0 | 20.0 | 82.3 | 311 |
| 2-amino-4-butoxy-5-ethoxypyrimidine | 15.8 | 30.3 | 72.3 | 57 |
| 2-amino-4-benzoxy-5-ethoxypyrimidine | 0 | 23.5 | 28.3 | 20 |
| 2-amino-4-phenethoxy-5-ethoxypyrimidine | 9.7 | 31.0 | 109.0 | 168 |
| 2-amino-4-ethoxy-5-butoxypyrimidine | 0 | 7.7 | 54.8 | 611 |
| 2-amino-4-ethoxy-5-benzoxypyrimidine | 0 | 31.7 | 147.8 | 366 |
| 2-amino-4-ethoxy-5-phenethoxypyrimidine | 19.5 | 17.0 | 85.2 | 128 |
| 2-amino-4-benzoxy-5-butoxypyrimidine | 0 | 14.5 | 143.5 | 889 |
| 2-amino-4-butoxy-5-butoxypyrimidine | 43.5 | 35.0 | 263.0 | 235 |

TABLE III
2-Amino-4,5 Dialkoxypyrimidines vs. Nembutal, Intraperitoneal

| | Pyrimidine cpd. alone 100 mgm./kgm. hypnosis avg. min. (B) | Nembutal 40 mgm./kgm. hypnosis avg. min. (C) | Both cpds. hypnosis avg. min. (A) | Avg. Percent potentiation $\frac{A-B-C}{B+C} \times 100$ |
|---|---|---|---|---|
| 2-amino-4-ethoxy-6-ethoxypyrimidine | 0 | 23.3 | 33.8 | 45 |

TABLE IV
2-Amino-4,5,6-Trialkoxypyrimidines vs. Nembutal, Intraperitoneal

| | Pyrimidine cpd. alone 100 mgm./kgm. hypnosis avg. min. (B) | Nembutal 40 mgm./kgm. hypnosis avg. min. (C) | Both cpds. hypnosis avg. min. (A) | Avg. Percent potentiation $\frac{A-B-C}{B+C} \times 100$ |
|---|---|---|---|---|
| 2-amino-4-ethoxy-5-ethoxy-6-methyl-ethoxypyrimidine | 14.5 | 27.5 | 134.5 | 220 |

TABLE V
2-Amino-4,5-Diethoxypyrimidines vs. Various Types of Hypnotics, Intraperitoneal
[100 mg./kg. of 2-amino-4,5-diethoxypyrimidine in all cases]

| Hypnotic | Dose mgm./kgm. | Hypnosis avg. min. (C) | Pyrimidine 100 mgm./kgm. hypnosis avg. min. (B) | Both cpds. hypnosis avg. min. (A) | Average percent potentiation |
|---|---|---|---|---|---|
| 1. Barbiturates: | | | | | |
| a. Pentobarbital sodium (Nembutal) [monosodium ethyl-(1-methylbutyl) barbiturate] | 40 | 20.0 | 0 | 82.3 | 312 |
| b. Hexobarbital (Evipal) [N-methylcyclohexenyl barbituric acid] | 50 | 0 | 0 | 11.7 | ∞ |
| 2. Glyceryl derivatives: a. Mephenesin (Tolserol) [3-ortho-toloxy-1,2-propanediol] | 20 | 0 | 0 | 17.5 | ∞ |
| 3. Unsaturated alcohols: a. Methylparafynol (Dormison) [methyl-ethyl-ethynyl carbinol] | 200 | 0 | 0 | 77.2 | ∞ |
| 4. Piperidine derivatives: a. Methyprylon (Noludar) [3,3-diethyl-5-methyl-2,4-piperidinedione] | 200 | 24.0 | 0 | 69.2 | 188 |
| 5. Cycloheptyl derivatives: a. Medomin [5-ethyl-5-cyclohepten-1-yl-barbituric acid] | 50 | 0 | 0 | 22.0 | ∞ |
| 6. Cyclohexyl carbamates: a. Ethinamate (Valmid) [1-ethynyl-cyclohexyl-carbamate] | 100 | 0 | 0 | 17.8 | ∞ |

TABLE VI
2-Amino-4-Benzoxy-5-Butoxypyrimidines vs. Various Types of Hypnotics, Intraperitoneal

| Hypnotic | Dose mgm./kgm. | Hypnosis avg. min. (C) | Pyrimidine 50 mgm./kgm. hypnosis avg. min. (B) | Both cpds. hypnosis avg. min. (A) | Average percent potentiation |
|---|---|---|---|---|---|
| 1. Barbiturates: | | | | | |
| a. Pentobarbital sodium (Nembutal) | 40 | 14.5 | 0 | 143.5 | 889 |
| b. Hexobarbital (Evipal) | 50 | 0 | 0 | 24.0 | ∞ |
| 2. Cyclohexyl carbamates: | | | | | |
| a. Ethinamate (Valmid) | 100 | 0 | 0 | 8.0 | ∞ |

TABLE VII
Alkoxypyrimidines vs. Various Types of Hypnotics, Intravenous

| Hypnotic | Dose mgm./kgm. | Hypnosis avg. min. (C) | Pyrimidine | Dose mgm./kgm. | Hypnosis avg. min. (B) | Both cpds. hypnosis avg. min. (A) | Average percent potentiation |
|---|---|---|---|---|---|---|---|
| 1. Barbiturates: | | | | | | | |
| a. Pentobarbital sodium (Nembutal) | 20 | 69.5 | 2-amino-4,5-diethoxy pyrimidine | 20 | 0 | 122.2 | 76 |
| b. Hexobarbital (Evipal) | 15 | 0 | 2-amino-4-benzoxy-5-butoxypyrimidine | 10 | 0 | 6.0 | ∞ |
| 2. Glyceryl derivatives: a. Mephenesin (Tolserol) | 50 | 3.0 | 2-amino-4,5-diethoxy pyrimidine | 20 | 0 | 8.5 | 183 |

TABLE VIII
Alkoxypyrimidines vs. Various Types of Hypnotics, Oral

| Hypnotic | Dose mgm./kgm. | Hypnosis avg. min. (C) | Pyrimidine | Dose mgm./kgm. | Hypnosis avg. min. (B) | Both cpds. hypnosis avg. min. (A) | Average percent potentiation |
|---|---|---|---|---|---|---|---|
| 1. Barbiturates: | | | | | | | |
| a. Pentobarbital sodium (Nembutal). | 20 | 0 | 2-amino,-4,5-diethoxy pyrimidine | 100 | 0 | 27.0 | ∞ |
| | 40 | 130.5 | 2-amino-4-benzoxy-5-butoxyprimidine. | 100 | 0 | 189.2 | 37 |
| b. Hexobarbital | 100 | 13 | 2-amino-4,5-diethoxy pyrimidine | 100 | 0 | 56.0 | 331 |
| 2. Cyclohexyl carbamates: a. Ethinamate (Valmid). | 100 | 0 | 2-amino-4,5-diethoxy pyrimidine | 100 | 0 | 38.8 | ∞ |

TABLE IX
Dose-Response Determinations

| Administered | Hypnotic | Dose range mgm./kgm. | Pyrimidine | Dose range mgm./kgm. |
|---|---|---|---|---|
| Intraperitoneal | Nembutal | 10- 60 | 2-amino-4, 5-diethoxypyrimidine | 100 |
| Do | do | 40 | 2-amino-4-benzoxy-5-butoxy-pyrimidine | 50-100 |
| Do | Evipal | 50-100 | 2-amino-4,5-diethoxypyrimidine | 100 |
| Do | do | 50-100 | 2-amino-4-benzoxy-5-butoxy-pyrimidine | 50 |
| Do | Tolserol | 10- 40 | 2-amino-5,5-diethoxypyrimidine | 100 |
| Do | Dormison | 60-200 | do | 100 |
| Do | Noludar | 40-200 | do | 100 |
| Oral | Nembutal | 20- 60 | do | 100 |

What is claimed is:

1. A soporific composition comprising a 2-amino-pyrimidine having the formula:

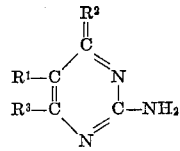

in which R¹ is selected from the group consisting of lower alkoxy, aryloxy, and aralkoxy radicals and R² and R³ are selected from the group consisting of hydrogen, alkoxy, aryloxy, and aralkoxy radicals; and a hypnotic selected from the group consisting of a barbiturate, methyl-ethyl-ethynyl carbinol, 1-ethynyl-cyclohexyl carbamate, 3,3-diethyl-5-methyl-2,4-piperidinedione, 3-orthotoloxy-1,2-propanediol, the ratio of hypnotic:2-aminopyrimidine being from about 10:100 to about 250:100 on a parts-by-weight basis.

2. A soporific composition comprising a 2-amino-pyrimidine having the formula:

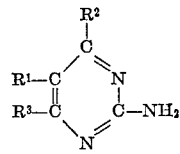

in which R¹ is selected from the group consisting of lower alkoxy, aryloxy, and aralkoxy radicals and R² and R³ are selected from the group consisting of hydrogen, alkoxy, aryloxy, and aralkoxy radicals; and a barbiturate, the ratio of the barbiturate:2-aminopyrimidine being from about 10:100 to about 250:100 on a parts-by-weight basis.

3. A soporific composition comprising a 2-amino-pyrimidine having the formula:

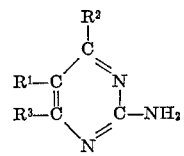

in which R¹ is selected from the group consisting of lower alkoxy, aryloxy, and aralkoxy radicals and R² and R³ are selected from the group consisting of hydrogen, alkoxy, aryloxy, and aralkoxy radicals; and methyl-ethyl-ethynyl carbinol, the ratio of methyl-ethyl-ethynyl carbinol:2-amino-pyrimidine being from about 10:100 to about 250:100 on a parts-by-weight basis.

4. A soporific composition comprising a 2-amino-pyrimidine having the formula:

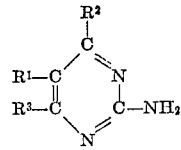

in which R¹ is selected from the group consisting of lower alkoxy, aryloxy, aralkoxy radicals and R² and R³ are selected from the group consisting of hydrogen, alkoxy, aryloxy, and aralkoxy radicals; and 1-ethynyl-cyclohexyl carbamate, the ratio of 1-ethynyl-cyclohexyl carbamate:2-aminopyrimidine being from about 10:100 to about 250:100 on a parts-by-weight basis.

5. A soporific composition comprising a 2-amino-pyrimidine having the formula:

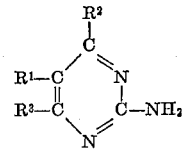

in which R¹ is selected from the group consisting of lower alkoxy, aryloxy, and aralkoxy radicals and R² and R³ are selected from the group consisting of hydrogen, alkoxy, aryloxy, and aralkoxy radicals; and 3,3-diethyl-5-methyl-2,4-piperidinedione, the ratio of 3,3-diethyl-5-methyl-2,4-piperidinedione:2-aminopyrimidine being from about 10:100 to about 250:100 on a parts-by-weight basis.

6. A soporific composition comprising a 2-amino-pyrimidine having the formula:

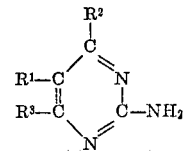

in which $R^1$ is selected from the group consisting of lower alkoxy, aryloxy, and aralkoxy radicals and $R^2$ and $R^3$ are selected from the group consisting of hydrogen, alkoxy, aryloxy, and aralkoxy radicals; and 3-orthotoloxy-1,2-propanediol:2-aminopyrimidine being from about 10:100 to about 250:100 on a parts-by-weight basis.

7. A soporific composition comprising a 2-amino-pyrimidine having the formula:

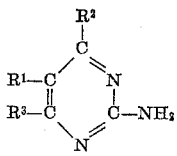

in which $R^1$ is selected from the group consisting of lower alkoxy, aryloxy, and aralkoxy radicals and $R^2$ and $R^3$ are selected from the group consisting of hydrogen, alkoxy, aryloxy, and aralkoxy radicals; and monosodium ethyl (1-methylbutyl) barbiturate, the ratio of monosodium ethyl (1-methylbutyl) barbiturate:2-aminopyrimidine being from about 10:100 to about 250:100 on a parts-by-weight basis.

8. A soporific composition comprising a 2-aminopyrimidine having the formula:

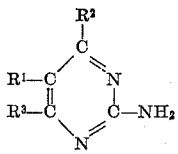

in which $R^1$ is selected from the group consisting of lower alkoxy, aryloxy, and aralkoxy radicals and $R^2$ and $R^3$ are selected from the group consisting of hydrogen, alkoxy, aryloxy, and aralkoxy radicals; and N-methylcyclohexenyl barbituric acid, the ratio of N-methylcyclohexenyl barbituric acid:2-aminopyridmidine being from about 10:100 to about 250:100 on a parts-by-weight basis.

9. A soporific composition comprising a 2-aminopyrimidine having the formula:

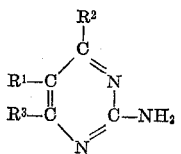

in which $R^1$ is selected from the group consisting of lower alkoxy, aryloxy, and aralkoxy radicals and $R_2$ and $R_3$ are selected from the group consisting of hydrogen, alkoxy, aryloxy, and aralkoxy radicals; and 5-ethyl-5-cyclohepten-1-yl-barbituric acid, the ratio of 5-ethyl-5-cyclohepten-1-yl-barbituric acid:2-aminopyrimidine being from about 10:100 to about 250:100 on a parts-by-weight basis.

10. A soporific composition comprising about 100 parts by weight of 2-amino-4-methoxy-5-ethoxypyrimidine and from about 10 to about 250 parts by weight of monosodium ethyl (1-methylbutyl) barbiturate.

11. A soporific composition comprising about 100 parts by weight of 2-amino-4-benzoxy-5-butoxypyrimidine and from about 10 to about 250 parts by weight of monosodium ethyl (1-methylbutyl) barbiturate.

12. A soporific composition comprising about 100 parts by weight of 2-amino-4-ethoxy-5-butoxypyrimidine and from about 10 to about 250 parts by weight of monosodium ethyl (1-methylbutyl) barbiturate.

13. A soporific composition comprising about 100 parts by weight of 2-amino-4-benzoxy-5-butoxypyrimidine and from about 10 to about 250 parts by weight of N-methylcyclohexenyl barbituric acid.

14. A soporific composition comprising about 100 parts by weight of 2-amino-4,5-diethoxypyrimidine and from about 10 to about 250 parts by weight of 5-ethyl-5-cyclohepten-1-yl-barbituric acid.

15. A soporific composition comprising about 100 parts by weight of 2-amino-4,5-diethoxypyrimidine and from about 10 to about 250 parts by weight of methyl-ethyl-ethylnyl carbinol.

16. A soporific composition comprising about 100 parts by weight of 2-amino-4-benzoxy-5-butoxypyrimidine and from about 10 to about 250 parts by weight of 1-ethylnylcyclohexyl carbamate.

17. A soporific composition comprising about 100 parts by weight of a 2-amino-4,5-diethoxypyrimidine and from about 10 to about 250 parts by weight of monosodium ethyl (1-methylbutyl) barbiturate.

No references cited.